(12) United States Patent
Emura et al.

(10) Patent No.: US 10,086,905 B2
(45) Date of Patent: Oct. 2, 2018

(54) BICYCLE FRONT DERAILLEUR WITH MOUNTING BRACKET

(71) Applicant: Shimano Inc., Sakai, Osaka (JP)

(72) Inventors: Atsuhiro Emura, Sakai (JP); Kenkichi Inoue, Sakai (JP); Kazuya Kuwayama, Sakai (JP); Kohei Obuchi, Sakai (JP); Mineho Masuda, Sakai (JP); Kento Mitsuyasu, Sakai (JP)

(73) Assignee: SHIMANO INC., Osaka (JP)

( * ) Notice: Subject to any disclaimer, the term of this patent is extended or adjusted under 35 U.S.C. 154(b) by 218 days.

(21) Appl. No.: 15/076,679

(22) Filed: Mar. 22, 2016

(65) Prior Publication Data
US 2017/0274962 A1    Sep. 28, 2017

(51) Int. Cl.
| F16H 9/00 | (2006.01) |
| F16H 59/00 | (2006.01) |
| F16H 61/00 | (2006.01) |
| F16H 63/00 | (2006.01) |
| B62M 9/135 | (2010.01) |
| B62K 25/28 | (2006.01) |

(52) U.S. Cl.
CPC ........... B62M 9/135 (2013.01); B62K 25/286 (2013.01)

(58) Field of Classification Search
CPC .... B62M 9/135; B62M 9/1342; B62M 9/136; B62M 9/137; B62M 25/08
USPC .................................................. 474/80, 82
See application file for complete search history.

(56) References Cited

U.S. PATENT DOCUMENTS

| 4,424,048 A * | 1/1984 | Shimano ................ B62M 9/137 474/82 |
| 5,496,222 A * | 3/1996 | Kojima ................ B62M 9/1342 474/80 |
| 5,620,384 A * | 4/1997 | Kojima ................ B62M 9/1342 474/123 |
| 5,846,148 A * | 12/1998 | Fujii .................... B62M 9/1344 474/80 |
| 6,099,425 A * | 8/2000 | Kondo ................... B62M 9/137 474/127 |
| 6,146,298 A * | 11/2000 | Nanko ................... B62M 9/135 474/127 |
| 6,234,927 B1 * | 5/2001 | Peng .................... B62M 9/1342 474/80 |
| 6,277,044 B1 * | 8/2001 | Fujimoto ................ B62J 23/00 474/80 |
| 6,612,950 B2 * | 9/2003 | Nanko ................... B62M 9/135 474/80 |
| 7,014,584 B2 * | 3/2006 | Nanko ................. B62M 9/1342 474/80 |
| D523,380 S | 6/2006 | Auger et al. |
| 7,081,058 B2 * | 7/2006 | Nankou ............... B62M 9/1342 474/80 |
| 7,341,532 B2 * | 3/2008 | Ichida .................... B62M 9/132 474/70 |
| 7,438,657 B2 * | 10/2008 | Nakai ................. B62M 9/1342 474/80 |

(Continued)

*Primary Examiner* — Henry Y Liu (57) ABSTRACT

A bicycle front derailleur including a chain guide; a linkage assembly; and a mounting bracket configured to mount the chain guide to a bicycle frame such that the chain guide is movable with respect to the mounting bracket. The mounting bracket includes at least one fixed portion adapted to receive a fastener to fix the fixed portion so that an axis of the fastener extends toward a bottom bracket hangar of the bicycle frame when the fixed portion is fixed to the bicycle frame via the fastener. The axis of the fastener is generally vertical.

29 Claims, 9 Drawing Sheets

(56) References Cited

U.S. PATENT DOCUMENTS

| | | | | |
|---|---|---|---|---|
| 7,438,658 B2* | 10/2008 | Tetsuka | ................ | B62M 9/1342 |
| | | | | 474/122 |
| 7,442,136 B2* | 10/2008 | Ichida | .................... | B62M 9/132 |
| | | | | 474/80 |
| 7,503,863 B2* | 3/2009 | Ichida | .................... | B62M 9/132 |
| | | | | 474/70 |
| 7,651,424 B2* | 1/2010 | Yamamoto | ........... | B62M 9/1342 |
| | | | | 474/82 |
| 7,677,998 B2* | 3/2010 | Tetsuka | ................ | B62M 9/1342 |
| | | | | 474/80 |
| 7,722,487 B2* | 5/2010 | Ichida | .................... | B62M 9/135 |
| | | | | 474/80 |
| 7,779,724 B2* | 8/2010 | Fujii | ...................... | B62M 25/08 |
| | | | | 192/217 |
| 7,867,118 B2* | 1/2011 | Yamamoto | ............. | B62M 9/136 |
| | | | | 474/80 |
| 7,951,028 B2* | 5/2011 | Wickliffe | ................ | B62M 9/136 |
| | | | | 474/80 |
| 8,075,009 B2* | 12/2011 | Cocalis | .................. | B62K 25/28 |
| | | | | 280/284 |
| 8,678,963 B2* | 3/2014 | Kuwayama | .......... | B62M 9/1348 |
| | | | | 474/80 |
| 8,770,608 B1* | 7/2014 | Chamberlain | ......... | B62M 9/135 |
| | | | | 280/261 |
| 8,808,123 B2* | 8/2014 | Inoue | ..................... | B62M 9/136 |
| | | | | 474/80 |
| 8,888,620 B2* | 11/2014 | Emura | ................... | B62M 9/135 |
| | | | | 474/80 |
| 8,932,162 B2* | 1/2015 | Emura | ................... | B62M 9/131 |
| | | | | 474/80 |
| 9,452,807 B2* | 9/2016 | Emura | ................... | B62M 9/135 |
| 2003/0083163 A1* | 5/2003 | Nanko | ................... | B62M 9/135 |
| | | | | 474/82 |
| 2006/0068955 A1* | 3/2006 | Oi | .......................... | B62M 9/135 |
| | | | | 474/78 |

* cited by examiner

BICYCLE FRONT DERAILLEUR WITH MOUNTING BRACKET

BACKGROUND OF THE INVENTION

The invention generally relates to a bicycle front derailleur and, more particularly, to a bracket of the front derailleur for mounting the front derailleur to a pivotal frame member of a bicycle frame.

Front derailleurs are typically mounted to a bicycle frame near the bottom bracket hanger. However, in some frame configurations of modern bicycles, this is a crowded location, and it is sometimes difficult to avoid interference between a mounting member to mount the front derailleur and other parts. For example, in a frame configuration in which the chain stays pivot with respect to a seat tube having the bottom bracket hanger, there may be interference between the mounting member of the front derailleur and a pivot joint of the chain stays.

SUMMARY OF THE INVENTION

In a first aspect, the invention is a bicycle front derailleur including a chain guide; a linkage assembly; and a mounting bracket configured to mount the chain guide to a bicycle frame such that the chain guide is movable with respect to the mounting bracket. The mounting bracket includes at least one fixed portion adapted to receive a fastener to fix the fixed portion so that the fastener extends toward a bottom bracket hanger of the bicycle frame in a state in which the fixed portion is fixed to the bicycle frame via the fastener.

In a second aspect, in the bicycle front derailleur of the first aspect, the fixed portion defines a fastener axis that is vertical or generally vertical when the bicycle is in an upright position and in the state in which the fixed portion is fixed to the bicycle frame.

In a third aspect, in the bicycle front derailleur according to the second aspect, the fastener axis is in close proximity to a pivot joint between a first tubular part and a second tubular part of the bicycle frame.

In a fourth aspect, in the bicycle front derailleur according to any of the previous aspects, a lower surface of the fixed portion is configured to face an upper surface of a tubular part of the bicycle frame when the bicycle is in an upright position and in the state in which the fixed portion is fixed to the bicycle frame.

In a fifth aspect, in the bicycle front derailleur according to the fourth aspect, the tubular part is a first tubular part, and the fixed portion defines a fastener axis that is in close proximity to a pivot joint between the first tubular part and a second tubular part of the bicycle frame in the state in which the fixed portion is fixed to the bicycle frame.

In a sixth aspect, in the bicycle front derailleur according to any of the previous aspects, the fixed portion defines a fastener axis that is perpendicular to a rotational center axis of a bicycle front sprocket in the state in which the mounting bracket is mounted to the bicycle frame, and wherein the fixed portion is configured to be fixed to a chain stay of the bicycle frame.

In a seventh aspect, in the bicycle front derailleur according to any of the previous aspects, the mounting bracket further includes a main body, and the fixed portion includes a flange.

In an eighth aspect, in the bicycle front derailleur according to the seventh aspect, the flange protrudes from the main body away from the chain guide.

In a ninth aspect, in the bicycle front derailleur according to either of the seventh and eighth aspects, the flange is configured to be located closer to the bicycle frame than the chain guide in the state in which the fixed portion is fixed to the bicycle frame.

In a tenth aspect, in the bicycle front derailleur according to any of the previous aspects, the fixed portion is a first fixed portion, the flange is a first flange, the mounting bracket includes a second fixed portion, and the second fixed portion includes a second flange.

In an eleventh aspect, in the bicycle front derailleur according to the tenth aspect, the second flange protrudes in a forward direction from the main body.

In a twelfth aspect, in the bicycle front derailleur according to any of the previous aspects, the fixed portion is a first fixed portion, the mounting bracket includes a second fixed portion and a main body, the main body includes at least one connecting portion pivotally connected to the linkage assembly, and wherein the connecting portion is located between the first and second fixed portions as viewed in a direction parallel to a rotational center axis of the front sprocket in a state in which the fixed portions are fixed to the bicycle frame.

In a thirteenth aspect, in the bicycle front derailleur according to the twelfth aspect, the first and second fixed portions define first and second fastener axes, respectively, and a pivot axis defined by the connecting portion is non-parallel to either of the first and second fastener axes.

In a fourteenth aspect, in the bicycle front derailleur according to any of the previous aspects, further including an adjusting structure configured to adjust a position of the mounting bracket relative to the bicycle frame in a direction of a fastener axis defined by the fixed portion.

In a fifteenth aspect, in the bicycle front derailleur according to the fourteenth aspect, the adjusting structure includes at least one spacer selectively located between the fixed portion and the bicycle frame.

In a sixteenth aspect, the invention is a bicycle front derailleur including a mounting bracket configured to mount a bicycle front derailleur to a bicycle frame. The mounting bracket includes at least one connecting portion pivotally connected to the linkage assembly and a first fixed portion through which a first fastener passes. The first fixed portion defines a first fastener axis, which is non-parallel to a rotational center axis of a bicycle front sprocket in a state in which the mounting bracket is mounted to the bicycle frame. The mounting bracket further includes a second fixed portion through which a second fastener passes. The second fixed portion defines a second fastener axis, which is non-parallel to the rotational center axis in the state in which the mounting bracket is mounted to the bicycle frame. The connecting portion is located between the first and second fixed portions as viewed in a direction parallel to the rotational center axis.

In a seventeenth aspect, in the bicycle front derailleur according to the sixteenth aspect, the first fastener axis extends along a direction perpendicular to the rotational center axis.

In an eighteenth aspect, in the bicycle front derailleur according to any of the previous aspects, the second fastener axis extends along the direction perpendicular to the rotational center axis.

In a nineteenth aspect, in the bicycle front derailleur according to either of the seventeenth or eighteenth aspects, the mounting bracket further includes a main body and the first fixed portion includes a flange.

In a twentieth aspect, in the bicycle front derailleur according to the nineteenth aspect, the front derailleur includes a chain guide, and wherein the flange protrudes from the main body away from the chain guide.

In a twenty-first aspect, in the bicycle front derailleur according to either of the nineteenth or twentieth aspects, the flange is configured to be located closer to the bicycle frame than the chain guide in the state in which the mounting bracket is fixed to the bicycle frame.

In a twenty-second aspect, in the bicycle front derailleur according to any of the nineteenth through twenty-first aspects, the flange is a first flange, and the second fixed portion includes a second flange.

In a twenty-third aspect, in the bicycle front derailleur according to the twenty-second aspect, the second flange protrudes in a forward direction from the main body.

In a twenty-fourth aspect, in the bicycle front derailleur according to any of the sixteenth through twenty-third aspects, the first fastener axis and the second fastener axis are on opposite sides of a pivot joint between a first tubular part and a second tubular part of the bicycle frame in the state in which the mounting bracket is fixed to the bicycle frame.

In a twenty-fifth aspect, the bicycle front derailleur according to any of the sixteenth through twenty-fourth aspects further includes an adjusting structure configured to adjust a position of the mounting bracket relative to the bicycle frame in a direction of a fastener axis defined by the fixed portion.

In a twenty-sixth aspect, in the bicycle front derailleur according to the twenty-fifth aspect, the adjusting structure includes at least one spacer selectively located between the fixed portion and the bicycle frame.

In a twenty-seventh aspect, the invention is a bicycle front derailleur that includes a chain guide. The chain guide includes a first guide plate, second guide plate, a first bridge portion connecting the first and second guide plates at a first location, and a second bridge portion connecting the first and second guide plates at a second location that is different from the first location. The first bridge portion is positioned in a first plane, and the second bridge portion is positioned in a second plane. The bicycle front derailleur further includes a linkage assembly and a mounting bracket configured to mount the chain guide to a bicycle frame such that the chain guide is movable with respect to the mounting bracket. The mounting bracket includes at least one fixed portion defining a fastener axis that intersects with the first plane and the second plane.

In a twenty-eighth aspect, in the bicycle front derailleur according to the twenty-seventh aspect, the bicycle front derailleur further includes a cable attachment portion. The first bridge portion is closer to the cable attachment portion than the second bridge portion, and the fixed portion and the second bridge portion are located on the same side of the first plane.

In a twenty-ninth aspect, in the bicycle front derailleur according to either of the twenty-seventh or the twenty-eighth aspects, the fixed portion is positioned between the first plane and the second plane.

Other advantages and features of the present invention will become apparent to those skilled in the art from the following detailed description and the drawings.

DESCRIPTION OF THE EMBODIMENTS

Figure 1:
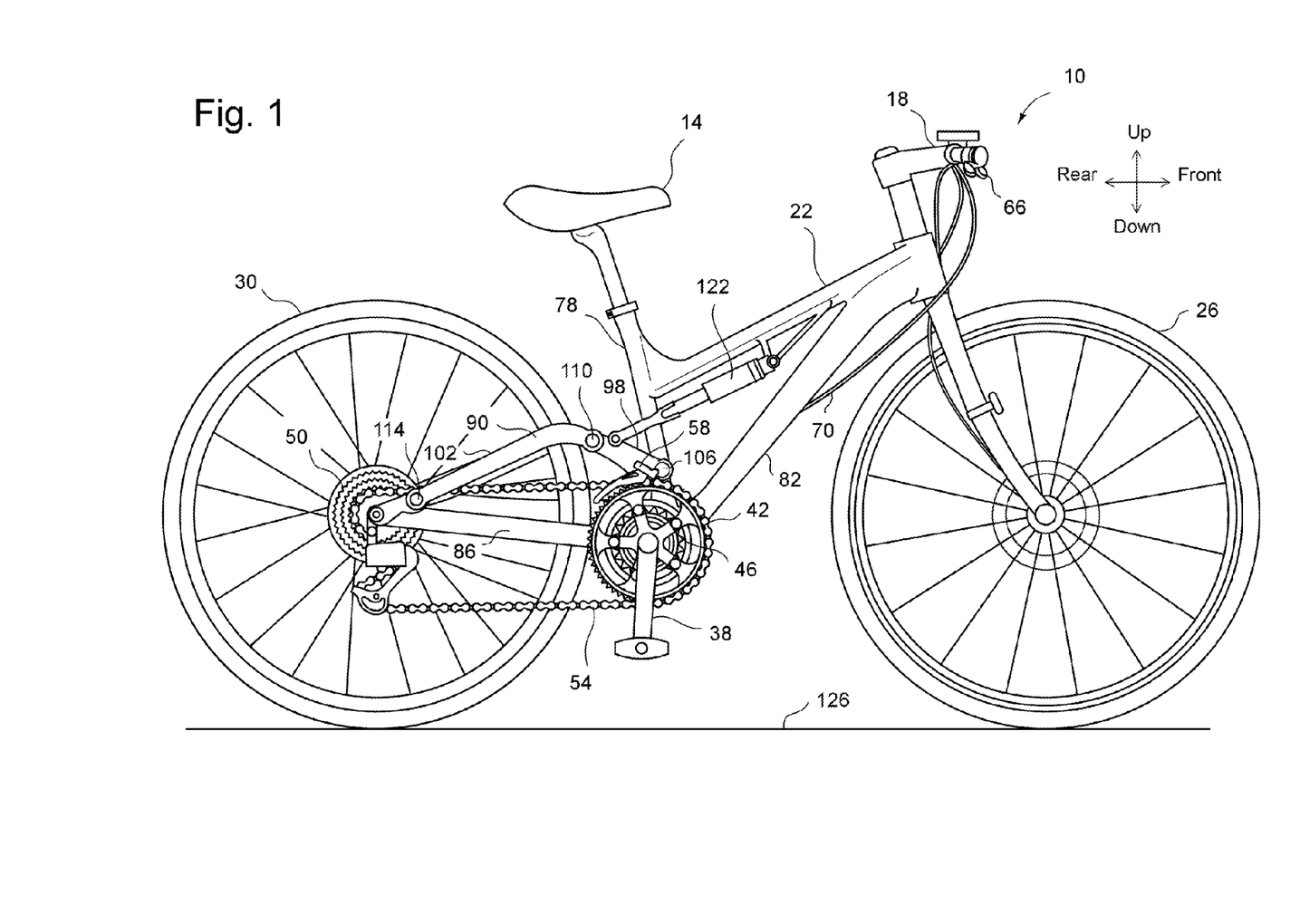
FIG. 1 is a right side view of a bicycle that includes the front derailleur according to a first embodiment of the invention.
Figure 2:
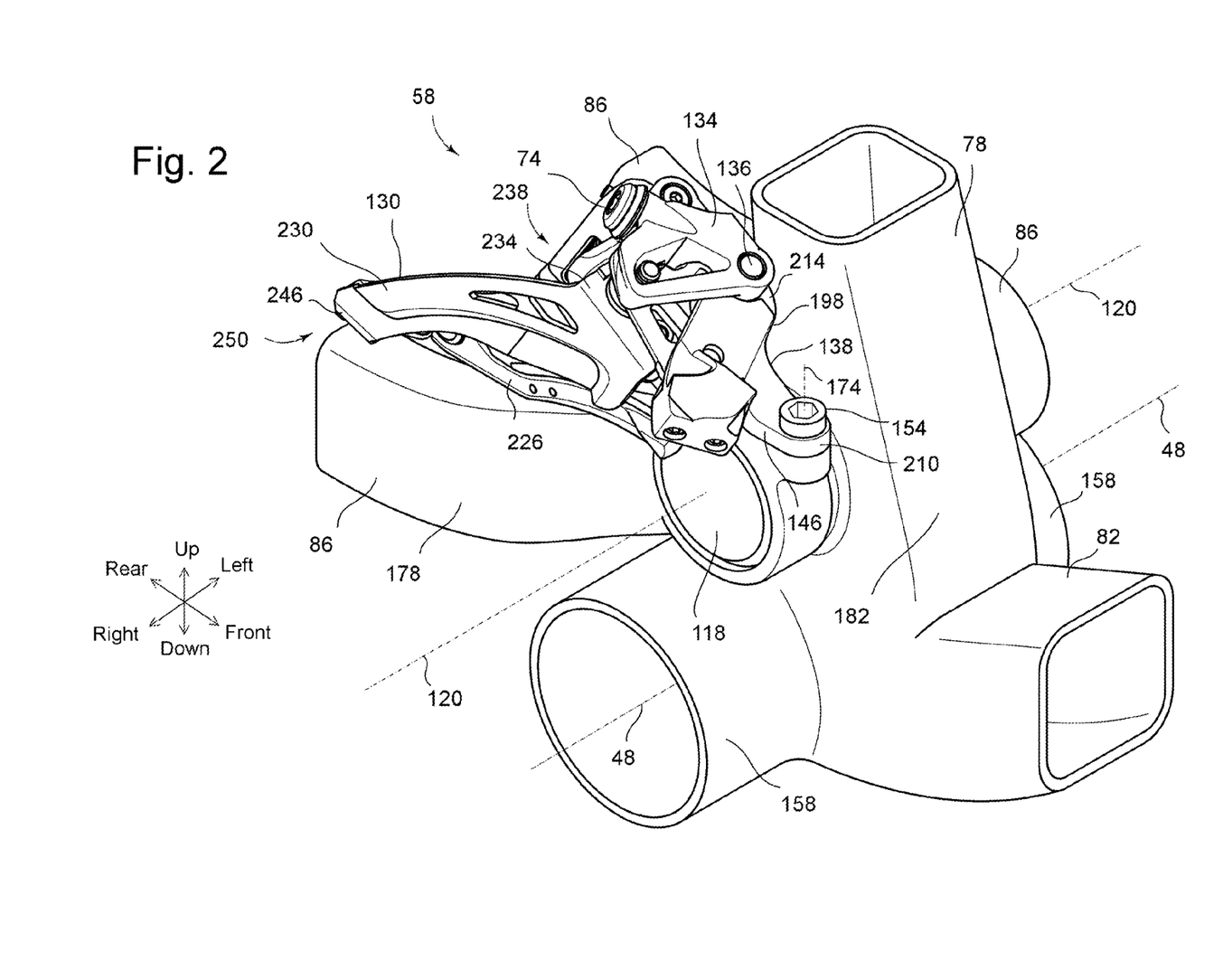
FIG. 2 is a partial perspective view of the front derailleur of FIG. 1 according to the first embodiment.

FIG. 1 shows a bicycle 10 that includes a seat 14, handlebars 18, a frame 22, a front wheel 26, a rear wheel 30, a crank arm 38, a first front sprocket 42, a second front sprocket 46, a rear sprocket assembly 50, a chain 54, and a front derailleur 58. The crank arm 38 rotates about a rotational center axis 48, or a crank arm axis (See FIG. 2). An operating device 66 is coupled to the front derailleur 58 by an operation cable 70 so that a rider can control the front derailleur 58 in a known manner. The operation cable 70 is attached to the front derailleur 58 at a cable attachment portion 74. The operating device 66 is, for example, a known device for pulling and releasing the operation cable 70.

Referring to FIG. 1, the frame 22 includes a seat tube 78, a down tube 82, right and left chain stays 86 and right and left seat stays 90. Although the frame 22 can have any number of configurations, in the illustrated bicycle frame 22, each seat stay 90 includes a front arm 98 and a rear arm 102. The front end of each front arm 98 is pivotally coupled to the seat tube 78 by a first pivot joint 106. The rear end of each front arm 98 is pivotally coupled to the front end of a corresponding one of the rear arms 102 by a second pivot joint 110. The rear end of each rear arm 102 is pivotally coupled to a rear end of a corresponding one of the chain stays 86 by a third pivot joint 114. The front end of each chain stay 86 is pivotally coupled to the seat tube 78 by a fourth pivot joint 118, the axis of which is a chain stay pivot axis 120 (shown in FIG. 2). In the bicycle 10 of FIG. 1, a rear end of a rear suspension 122 is pivotally coupled to the front arm 98, and a front end of the rear suspension 122 is pivotally coupled to the bicycle frame 22 in a known manner. Other unnumbered parts of the bicycle 10 are well-known and will not be discussed or illustrated in detail.

For reference purposes, the bicycle 10 is considered to be in an upright position in FIG. 1 such that the axis (unnumbered) of the rear wheel 30 is parallel to a horizontal support plane 126 on which the bicycle 10 rests. Directional indicator arrows are provided in each figure to indicate the various directions that apply when the bicycle front derailleur 58 is mounted on a bicycle that is in the upright position of FIG. 1. The directions are from the perspective of a seated rider.

Referring to FIGS. 2-6, in a first embodiment, the bicycle front derailleur 58 includes a chain guide 130; a linkage assembly 134; and a mounting bracket 138 configured to mount the chain guide 130 to the bicycle frame 22 such that the chain guide 130 is movable with respect to the mounting bracket 138. The mounting bracket 138 includes at least one fixed portion 142 adapted to receive a fastener 150 to fix the fixed portion 142 so that the fastener 150 extends toward a bottom bracket hanger 158 of the bicycle frame 22 in a state in which the fixed portion 142 is fixed to the bicycle frame 22 via the fastener 150. In the illustrated embodiment, the at least one fixed portion 142 includes a through hole to receive the fastener 150. However the fixed portion 142 can include a cutout portion to receive the fastener 150 as an alternative to or in addition to the through hole, if needed or desired. In the illustrated embodiment, the fastener 150 is one of a pair of the first fastener 150 and a second fastener 154; however, a single fastener 150 can be used to secure the fixed portion 142 to the bicycle frame 22. The chain guide 130 is movable laterally with respect to the mounting bracket 138 in response to movement of the operation cable 70 by the operating device 66 to transfer the chain between the front sprockets 42, 46 in a manner well-known in the art. As shown in the partial cross-sectional region of FIG. 5, in the illustrated embodiments, the fasteners 150, 154 are threaded bolts, and threaded openings 162 are formed in the bicycle frame 22 to receive the fasteners 150, 154.

Figure 5:
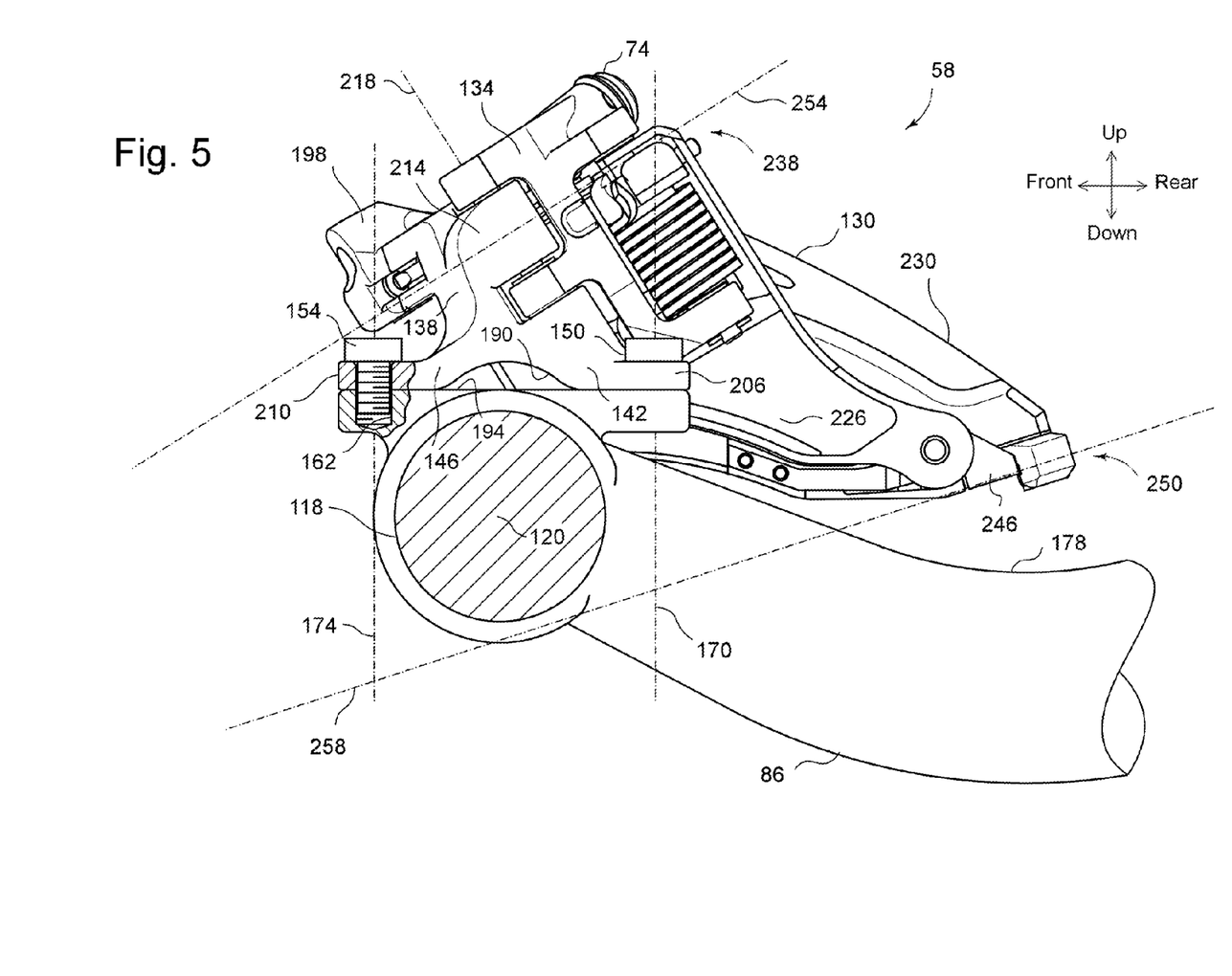
FIG. 5 is a partial left side view of the front derailleur of FIG. 3.

Referring to FIG. 5, the fixed portion 142 defines a fastener axis 170 that is vertical or generally vertical when the bicycle 10 is in an upright position and in the state in which the fixed portion 142 is fixed to the bicycle frame 22. More specifically, the fastener axis 170 may be defined by a center axis of the though hole of the fixed portion 142. The fastener axis 170 may correspond to a longitudinal center axis of the fastener 150, which is received by the fixed portion 142. FIG. 5 shows the fastener axes 170, 174 for the fasteners 150, 154. When the front derailleur 58 is fixed to a bicycle 10 that is in the upright position as shown in FIG. 1, the fastener axis 170 is generally vertical. "Generally vertical" is used herein to mean within ten degrees of true vertical, which is the up-down direction indicated in the figures.

Referring to FIGS. 2-5, the fastener axis 170 is in close proximity to the pivot joint 118 between a first tubular part 178 and a second tubular part 182 of the bicycle frame 22. In the embodiment of FIGS. 2-5, the first tubular part 178 is one of the chain stays 86 and the second tubular part 182 is the seat tube 78. However, other frame parts can serve as the first tubular part 178 and the second tubular part 182. While the second tubular part 182 is the seat tube 78 in the illustrated embodiment, the first tubular part 178 can be a member extending from the seat tube 78, for example. That is, although the pivot joint 118 is located directly on the seat tube 78 in the embodiment of FIGS. 2-5, the pivot joint 118 to which the fastener axis 170 is in close proximity can be located near the seat tube 78 but not directly on the seat tube 78. Also, in the embodiment of FIGS. 2-5, the pivot joint 118 between the first tubular part 178 and the second tubular part 182 is the fourth pivot joint 118; however, the position of the fastener axis 170 is not limited to the proximity of the fourth pivot joint 118 and can be located in close proximity to another pivot joint of the frame 22 that is near the front sprockets 42, 46.

With reference to FIG. 5, a lower surface 190 of the fixed portion 142 is configured to face an upper surface 194 of a tubular part 178 of the bicycle frame 22 when the bicycle 10 is in an upright position and in the state in which the fixed portion 142 is fixed to the bicycle frame 22. Further, the tubular part 178 is a first tubular part 178, and the fixed portion 142 defines the fastener axis 170, which is in close proximity to the pivot joint 118 between the first tubular part 178 and a second tubular part 182 of the bicycle frame 22 in the state in which the fixed portion 142 is fixed to the bicycle frame 22. As seen in FIG. 5, the fastener axis 174 defined by the fixed portion 146 (i.e. through hole of the fixed portion 146) is also in close proximity to the pivot joint 118.

Figure 3:
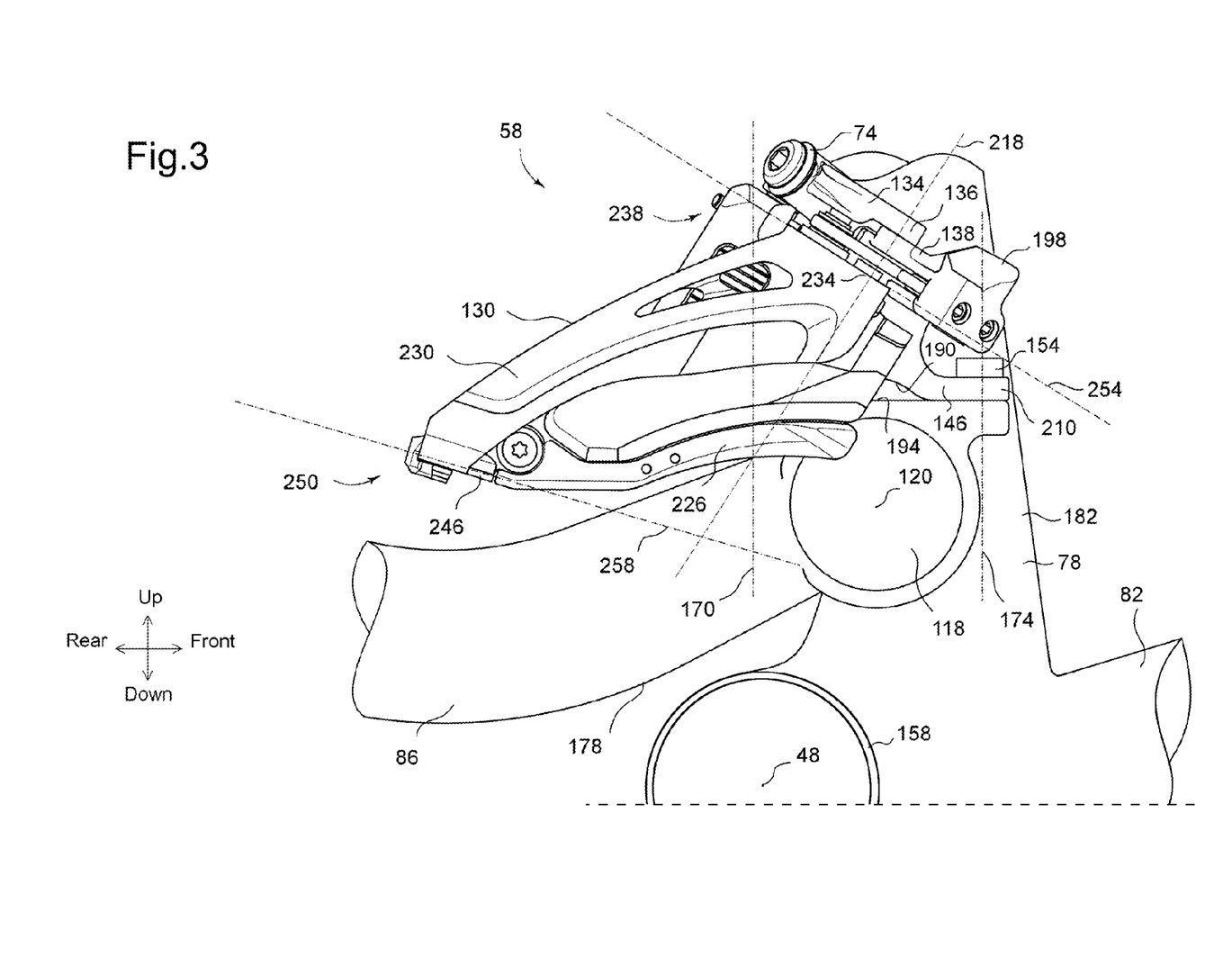
FIG. 3 is a partial right side view of the front derailleur of FIG. 2.

Referring to FIGS. 3 and 5, the fixed portion 142 defines the fastener axis 170 that is perpendicular to the rotational center axis 48 of a bicycle front sprocket 42, 46 in the state in which the mounting bracket 138 is mounted to the bicycle frame 22. The fixed portion 142 is configured to be fixed to a chain stay 86 of the bicycle frame 22. Although in the illustrated embodiments, the fastener axes 170, 174 are perpendicular to the rotational center axis 48 of the front sprockets 42, 46, the fastener axes 170, 174 need not be perfectly perpendicular but can be generally perpendicular to the rotational center axis 48 of the front sprockets 42, 46. Again, while the fixed portion 142 is configured to be fixed to a chain stay 86 in the embodiment of FIGS. 2-6, the fixed portion 142 can be configured to be fixed to other frame members, for example, as described below in connection with the third embodiment.

Figure 4:
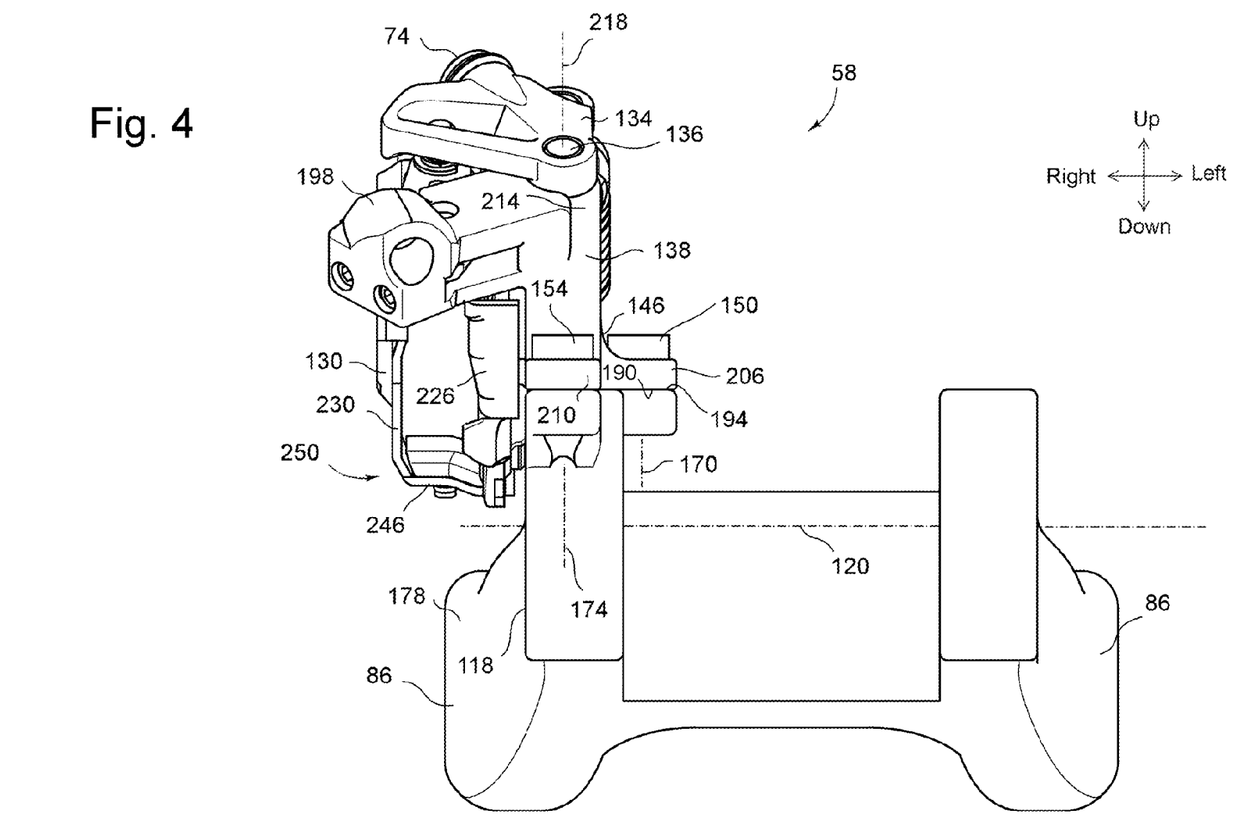
FIG. 4 is a partial front view of the front derailleur of FIG. 3.
Figure 6:
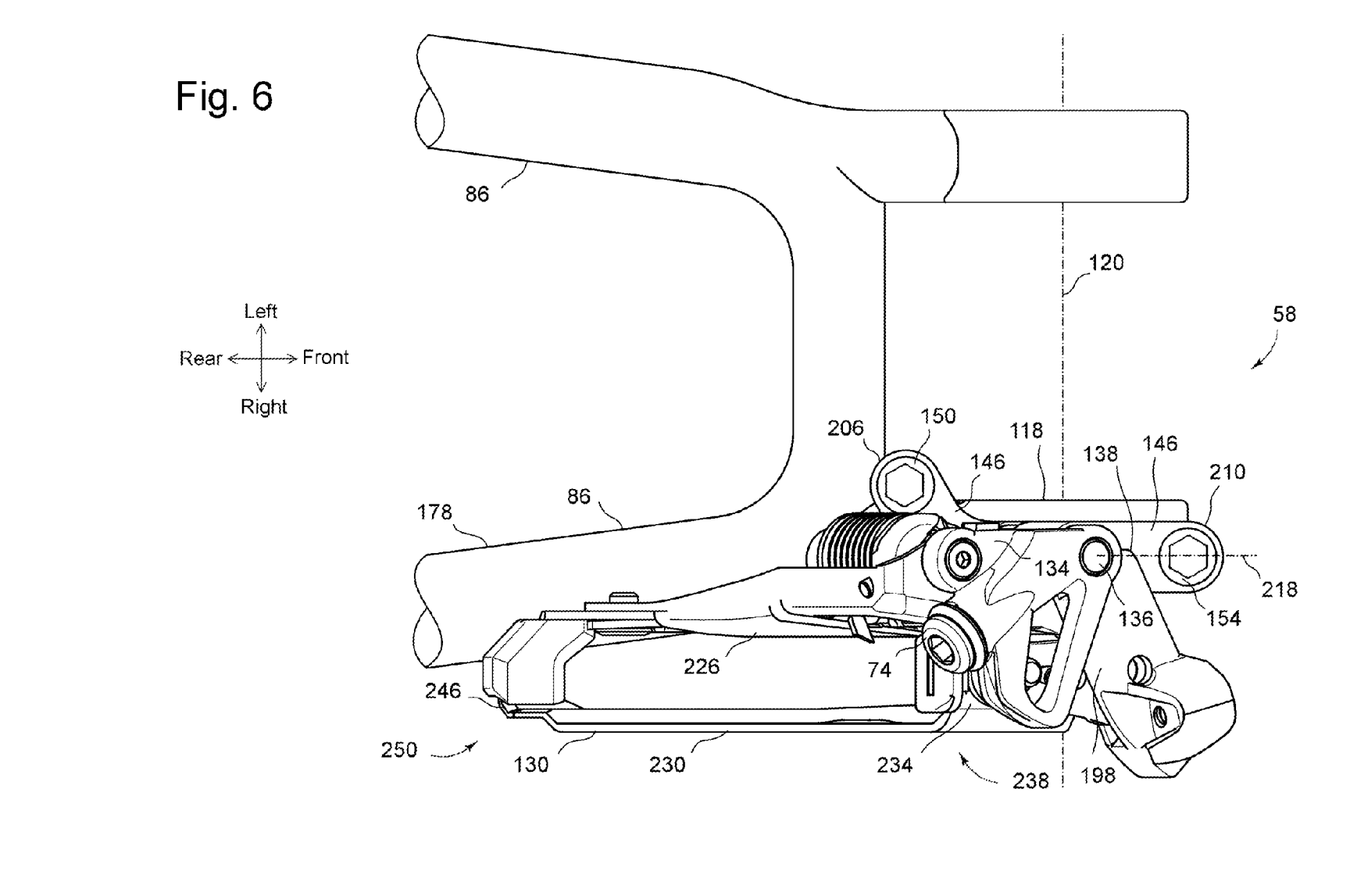
FIG. 6 is a partial top plan view of the derailleur of FIG. 3.

Referring to FIGS. 4-6, the mounting bracket 138 further includes a main body 198, and the fixed portion 142 includes a flange 206. In the illustrated embodiments, as shown, the flange 206 protrudes from the main body 198 away from the chain guide 130. The flange 206 is configured to be located closer to the bicycle frame 22 than the chain guide 130 in the state in which the fixed portion 142 is fixed to the bicycle frame 22. Further, as shown in FIGS. 4-6, the fixed portion 142 is a first fixed portion 142, the flange 206 is a first flange 206, the mounting bracket 138 includes a second fixed portion 146, and the second fixed portion 146 includes a second flange 210. As best shown in FIG. 6, the second flange 210 protrudes in a forward direction from the main body 198. Although there are both first and second flanges 206, 210 in the illustrated embodiment of FIGS. 2-6, the front derailleur 58 can have only one flange 206.

Thus, as described above and as shown in FIGS. 4-6, the fixed portion 142 is the first fixed portion 142, and the mounting bracket 138 includes the second fixed portion 146 and the main body 198. Further, the main body 198 includes at least one connecting portion 214 pivotally connected to the linkage assembly 134. As shown in FIG. 5, the connecting portion 214 is located between the first and second fixed portions 142, 146 as viewed in a direction parallel to the rotational center axis 48 of the front sprocket 42, 46 in a state in which the first and second fixed portions 142, 146 are fixed to the bicycle frame 22, as best viewed in FIG. 5. The connecting portion 214 may also be located between the first and second fastener axes 170 and 174 as viewed in the direction parallel to the rotational center axis 48. As shown in FIG. 5, a linkage assembly pivot joint 136 is provided between the main body 198 and the linkage assembly 134 to permit the linkage assembly 134 to pivot about a linkage assembly pivot axis 218, which permits the chain guide 130 to be moved laterally when the operation cable 70 is pulled or released. The linkage assembly pivot axis 218 is defined by the connecting portion 214. More specifically, the linkage assembly pivot axis 218 is defined by a center axis of a through hole of the connecting portion 214 through which a pivot pin pivotally connects the connecting portion 214 and the linkage assembly. Thus, the linkage assembly pivot axis 218 can also be defined by the longitudinal center axis of the pivot pin. As best viewed in FIG. 5, the first and second fixed portions 142, 146 define the first and second fastener axes 170, 174, respectively, and the pivot axis 218 defined by the connecting portion 214 is non-parallel to either of the first and second fastener axes 170, 174.

Thus, as described above, the bicycle front derailleur 58 includes the mounting bracket 138 configured to mount a bicycle front derailleur 58 to the bicycle frame 22. The mounting bracket 138 includes at least one connecting portion 214 pivotally connected to the linkage assembly 134 and the first fixed portion 142 through which the first fastener 150 passes. The first fixed portion 142 defines the first fastener axis 170, which is non-parallel to the rotational center axis 48 of the bicycle front sprocket 42, 46 in a state in which the mounting bracket 138 is mounted to the bicycle frame 22. The mounting bracket 138 further includes the second fixed portion 146 through which the second fastener 154 passes. The second fixed portion 146 defines the second fastener axis 174, which is non-parallel to the rotational center axis 48 in the state in which the mounting bracket 138 is mounted to the bicycle frame 22. The connecting portion 214 is located between the first and second fixed portions 142, 146 as viewed in a direction parallel to the rotational center axis 48. Further, in the illustrated embodiments, the first fastener axis 170 extends along a direction perpendicular to the rotational center axis 48. Herein, "extends along" is used to mean that the first fastener axis 170 extends in a direction that is within twenty degrees of being perpendicular to the rotational center axis 48.

Also, as best shown in FIGS. 3 and 5, the first fastener axis 170 and the second fastener axis 174 are on opposite sides of the pivot joint 118.

Referring to FIGS. 3-6, the relationship between parts of the front derailleur 58 is described as follows. The front derailleur 58 includes the chain guide 130 as described above. The chain guide 130 includes a first guide plate 226, second guide plate 230, a first bridge portion 234 connecting the first and second guide plates 226, 230 at a first location 238. Further, the chain guide 130 includes a second bridge portion 246 connecting the first and second guide plates 226, 230 at a second location 250 that is different from the first location 238. The first bridge portion 234 is positioned in a first plane 254, and the second bridge portion 246 is positioned in a second plane 258. Further, as described above, the bicycle front derailleur 58 includes the linkage assembly 134 and the mounting bracket 138 configured to mount the chain guide 130 to the bicycle frame 22 such that the chain guide 130 is movable with respect to the mounting bracket 138. The mounting bracket 138 includes at least one fixed portion 142 defining the fastener axis 170 that intersects with the first plane 254 and the second plane 258.

The bicycle front derailleur 58 includes the cable attachment portion 74. The cable attachment portion 74 is essentially a clamp for clamping the operation cable 70 to the front derailleur 58. The first bridge portion 234 is closer to the cable attachment portion 74 than the second bridge portion 246, and the fixed portion 142 and the second bridge portion 246 are located on the same side of the first plane 254. As best viewed in FIG. 5, the fixed portion 142 is positioned between the first plane 254 and the second plane 258.

Figure 7:
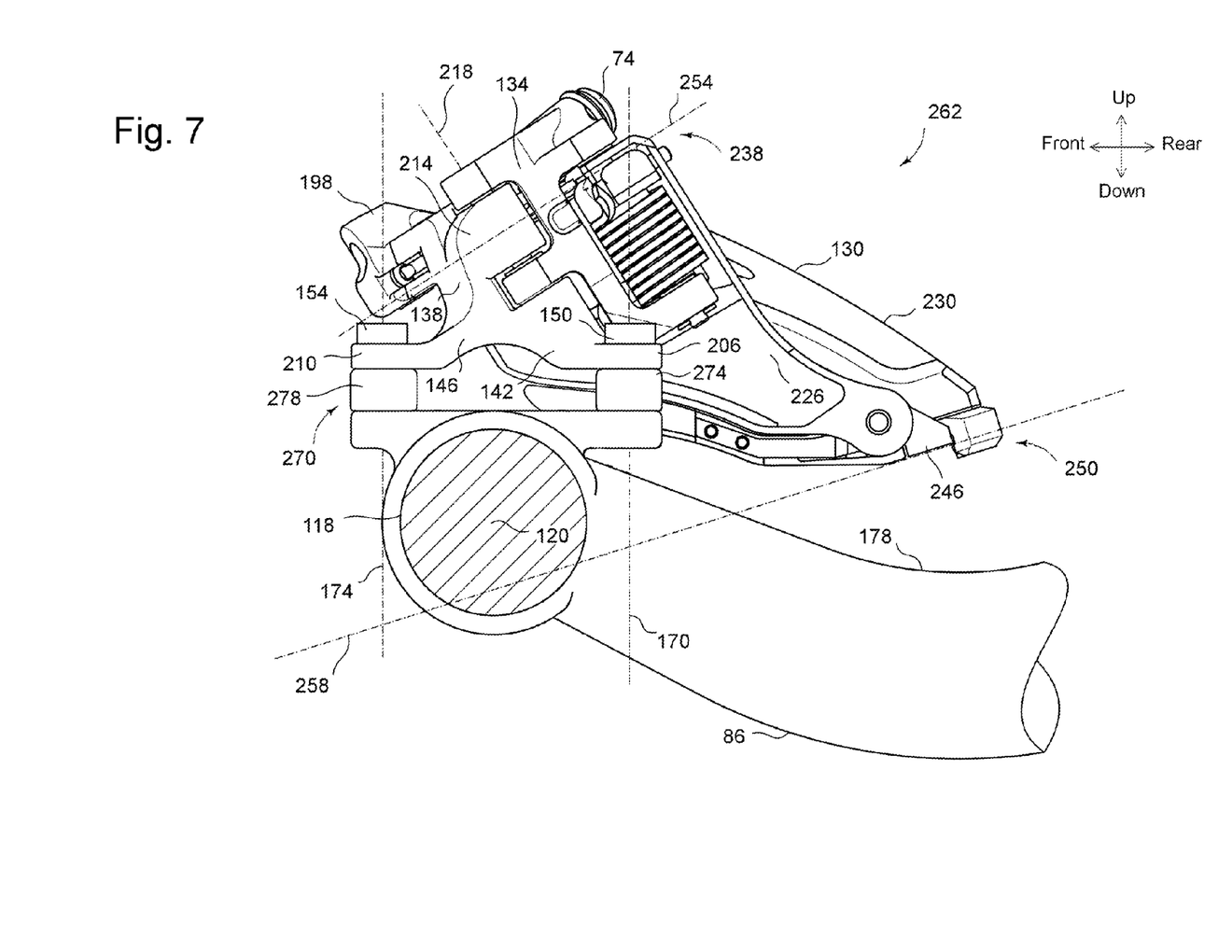
FIG. 7 is a partial left side view like FIG. 5 of a front derailleur of a second embodiment.

A second embodiment is described as follows with reference to FIG. 7. Reference numbers that are the same as those used in the description of the first embodiment may be used in the illustrations and description of the second and subsequent embodiments to designate corresponding parts that are the same or similar, and duplicate descriptions of such same or similar parts are omitted. FIG. 7 shows a front derailleur 262 that includes an adjusting structure 270 configured to adjust a position of the mounting bracket 138 relative to the bicycle frame 22 in a direction of the fastener axis 170 defined by the fixed portion 142. The adjusting structure 270 includes at least one spacer 274 selectively located between the fixed portion 142 and the bicycle frame 22. In the illustrated embodiment of FIG. 7, the spacer 274 is a first spacer 274 associated with the first fastener 150, and a second spacer 278 is associated with the second fastener 154. Specifically, the first spacer 274 and the second spacer 278 include fastener receiving holes through which the first fastener 150 and the second fastener 154 pass respectively. However, the adjusting structure 270 can employ only one spacer 274. Although only one spacer 274, 278 is shown in association with each fastener 150, 154 in FIG. 7, multiple spacers (not illustrated) that have various axial dimensions can be stacked along each fastener axis 170, 174 to adjust the distance between the lower surface 190 of the fixed portion 142 and the upper surface 194 of the chain stay 86. In other words, the adjusting structure 270 adjusts the height of the front derailleur 262. Addition or removal of spacers may be necessary when, for example, either of the front sprockets 42, 46 is replaced with one of a different size. The only difference between the front derailleur 262 of FIG. 7 and the front derailleur 58 of FIGS. 2-6 is the addition of the adjusting structure 270.

Figure 8:
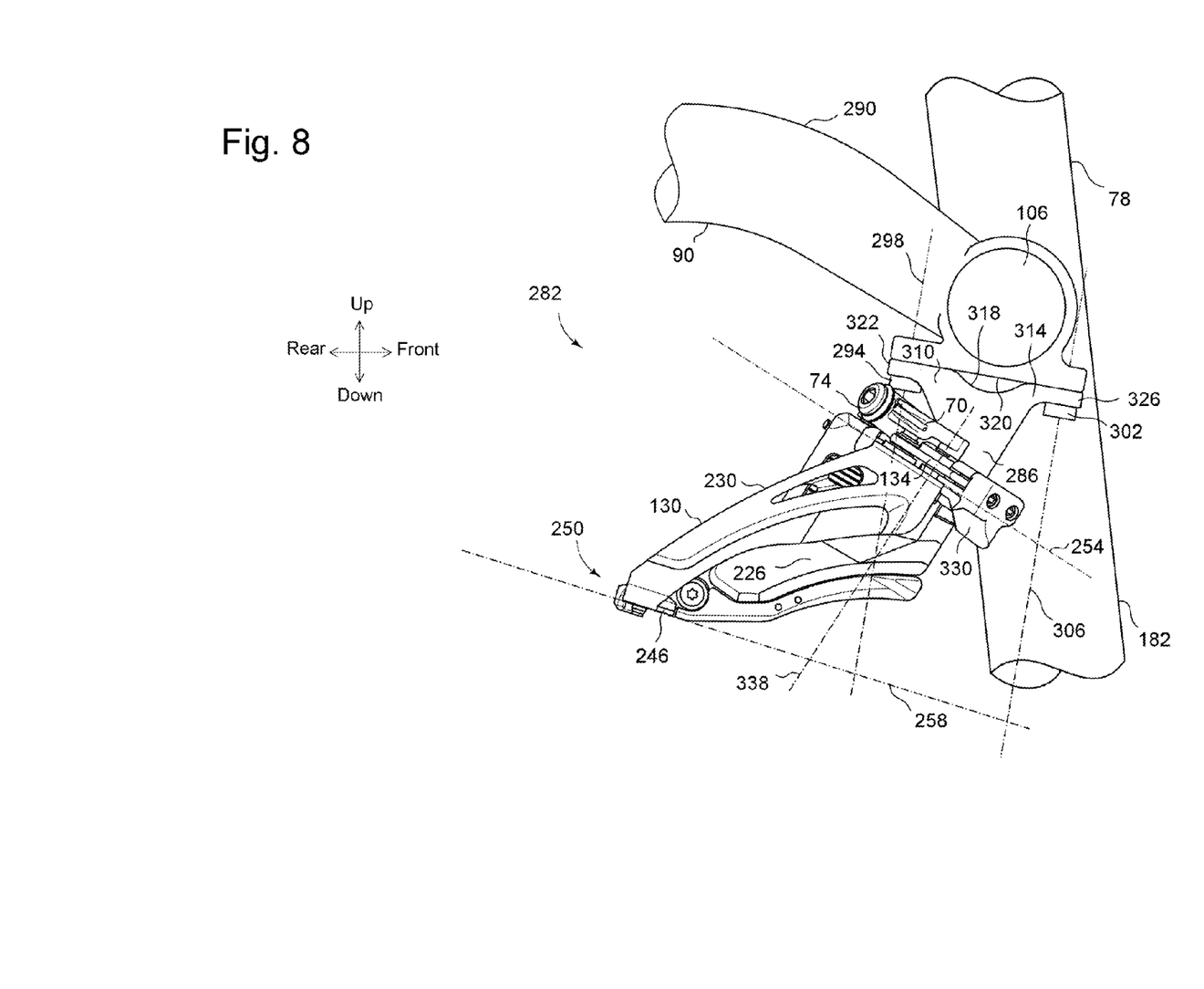
FIG. 8 is a right side view of a front derailleur of a third embodiment.
Figure 9:
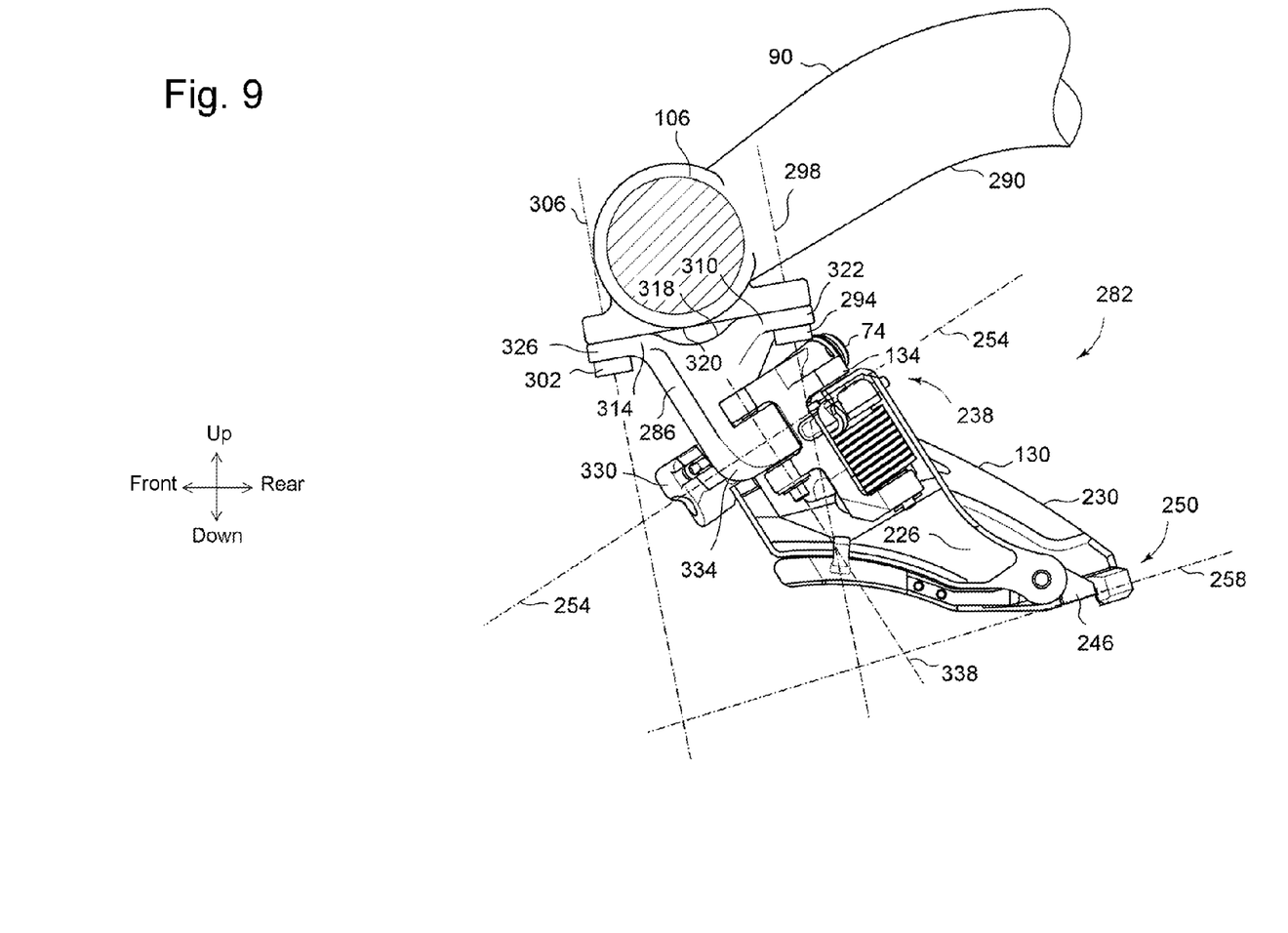
FIG. 9 is a left side view of the front derailleur of FIG. 8.

FIGS. 8 and 9 show a third embodiment. A front derailleur 282 of FIGS. 8 and 9 is essentially the same as that of the first and second embodiments except that a fixed portion 310 of a mounting bracket 286 of the front derailleur 282 of FIGS. 8 and 9 is inverted with respect to the fixed portion 142 of the front derailleur 58 shown in FIGS. 2-6, and the mounting bracket 286 of FIGS. 8 and 9 is adapted to be fixed to one of the seat stays 90, which, in this embodiment, is a first tubular part 290 pivotally attached to the second tubular part 182, which is the seat tube 78.

As shown in FIGS. 8 and 9, the mounting bracket 286 includes the fixed portion 310, which is adapted to receive a fastener 294 to fix the fixed portion 310 so that a fastener axis 298 of the fastener 294 extends toward the bottom bracket hanger 158 of the bicycle frame 22 in a state in which the fixed portion 310 is fixed to the bicycle frame 22 by the fastener 294. In the illustrated embodiment of FIGS. 8 and 9, the at least one fixed portion 310 includes a through hole to receive the fastener 294. However the fixed portion 310 can include a cutout portion to receive the fastener 310 as an alternative to or in addition to the through hole, if needed or desired. The fastener axis 298 is vertical or generally vertical when the bicycle 10 is in the upright position of FIG. 1 and in the state in which the fixed portion 310 is fixed to the bicycle frame 22. More specifically, the fastener axis 298 may be defined by a center axis of the though hole of the fixed portion 310. The fastener axis 298 may correspond to a longitudinal center axis of the fastener 294, which is received by the fixed portion 310. The fastener axis 298 is in close proximity to the pivot joint 106 between the seat tube 78 and one of the seat stays 90. In the third embodiment of FIGS. 8 and 9, the fixed portion 310 defines the fastener axis 298, which is perpendicular to the rotational center axis 48 of the front sprockets 42, 46 in the state in which the mounting bracket 286 is mounted to the bicycle frame 22. The fixed portion 310 is configured to be fixed to a seat stay 90 of the bicycle frame 22. Thus, an upper surface 318 of the fixed portion 310 is configured to face a lower surface 320 of the seat stay 90 when the bicycle 10 is in the upright position and in the state in which the fixed portion 310 is fixed to the bicycle frame 22.

The adjustment structure of FIG. 7 can be included in the front derailleur 282 of the third embodiment. That is, a spacer 274 or spacers 274, 278 can be placed between the fixed portion 310 and the bicycle frame 22 to adjust the height of the front derailleur 282.

In the embodiment of FIGS. 8 and 9, as in the first embodiment, the fixed portion 310 is a first fixed portion 310 that has a flange 322, and the flange 322 is a first flange 322. The mounting bracket 286 includes a second fixed portion 314, and the second fixed portion 314 includes a second flange 326. The mounting bracket 286 includes a main body 330, and the main body 330 includes at least one connecting portion 334 pivotally connected to the linkage assembly 134. The connecting portion 334 is located between the first and second fixed portions 310, 314 as viewed in a direction parallel to the rotational center axis 48 in the state in which the fixed portions 310, 314 are fixed to the bicycle frame 22. The connecting portion 334 may also be located between the first and second fastener axes 298 and 306 as viewed in a direction parallel to the rotational center axis 48.

The fastener 294 is a first fastener 294, and a second fastener 302 is spaced apart from the first fastener 294 as in the first embodiment. The first and second fixed portions 310, 314 define the first fastener axis 298 and a second fastener axis 306, respectively. As in the first embodiment, in the derailleur 282 of the third embodiment, a linkage assembly pivot axis 338 defined by the connecting portion 334 is non-parallel to either of the first and second fastener axes 298, 306. More specifically, the linkage assembly pivot axis 338 is defined by a center axis of a through hole of the connecting portion 334 through which a pivot pin pivotally connects the connecting portion 334 and the linkage assembly 134. Thus, the linkage assembly pivot axis 338 can also be defined by the longitudinal center axis of the pivot pin.

According to the present invention, the mounting bracket is fixed to the bicycle frame by the fastener that extends toward the bottom bracket hanger of the bicycle frame. With this arrangement, there is no need for the mounting bracket to be located in the axial direction of the pivot joint of the frame member with respect to the pivot joint. Therefore, the pivot joint can be wider without interfering with the front sprocket or the bicycle crank assembly. In other words, the mounting bracket does not occupy space that is between the pivot joint and the front sprocket in the axial direction of the pivot joint, which permits the pivot joint to be wider and thus stronger.

While the invention has been described in detail with respect to specific embodiments, those skilled in the art, upon attaining an understanding of the specific embodiments, may readily conceive of alterations, variations, and equivalents to these embodiments. Accordingly, the scope of the invention should be assessed as that of the appended claims and their equivalents.

The invention claimed is:

1. A bicycle front derailleur comprising:
a chain guide;
a linkage assembly; and
a mounting bracket configured to mount the chain guide to a bicycle frame such that the chain guide is movable with respect to the mounting bracket, wherein the mounting bracket includes at least one fixed portion adapted to receive a fastener to fix the at least one fixed portion to a pivot joint of the bicycle frame so that the fastener extends toward a bottom bracket hanger of the bicycle frame in a state in which the at least one fixed portion is fixed to the pivot joint of the bicycle frame via the fastener, wherein the pivot joint differs from the bottom bracket hanger.

2. The bicycle front derailleur according to claim 1, wherein the at least one fixed portion defines a fastener axis that is vertical or generally vertical when the bicycle is in an upright position and in the state in which the at least one fixed portion is fixed to the bicycle frame.

3. The bicycle front derailleur according to claim 2, wherein the fastener axis is in close proximity to the pivot joint between a first tubular part and a second tubular part of the bicycle frame.

4. The bicycle front derailleur according to claim 1, wherein a lower surface of the at least one fixed portion is configured to face an upper surface of a tubular part of the bicycle frame when the bicycle is in an upright position and in the state in which the at least one fixed portion is fixed to the bicycle frame.

5. The bicycle front derailleur according to claim 4, wherein the tubular part is a first tubular part, and the at least one fixed portion defines a fastener axis that is in close proximity to the pivot joint between the first tubular part and a second tubular part of the bicycle frame in the state in which the at least one fixed portion is fixed to the bicycle frame.

6. The bicycle front derailleur according to claim 1, wherein the at least one fixed portion defines a fastener axis that is perpendicular to a rotational center axis of a bicycle front sprocket in the state in which the mounting bracket is mounted to the bicycle frame, and wherein the at least one fixed portion is configured to be fixed to a chain stay of the bicycle frame.

7. The bicycle front derailleur according to claim 1, wherein the mounting bracket further comprises a main body, and the at least one fixed portion includes a flange.

8. The bicycle front derailleur according to claim 7, wherein the flange protrudes from the main body away from the chain guide.

9. The bicycle front derailleur according to claim 8, wherein the flange is configured to be located closer to the bicycle frame than the chain guide in the state in which the at least one fixed portion is fixed to the bicycle frame.

10. The bicycle front derailleur according to claim 7, wherein the at least one fixed portion is a first fixed portion, the flange is a first flange, the mounting bracket includes a second fixed portion, and the second fixed portion includes a second flange.

11. The bicycle front derailleur according to claim 10, wherein the second flange protrudes in a forward direction from the main body.

12. A bicycle front derailleur comprising:
a chain guide;
a linkage assembly; and
a mounting bracket configured to mount the chain guide to a bicycle frame such that the chain guide is movable with respect to the mounting bracket, wherein the mounting bracket includes at least one fixed portion adapted to receive a fastener to fix the at least one fixed portion so that the fastener extends toward a bottom bracket hanger of the bicycle frame in a state in which the at least one fixed portion is fixed to the bicycle frame via the fastener,
wherein the at least one fixed portion is a first fixed portion, the mounting bracket includes a second fixed portion and a main body, the main body includes at least one connecting portion pivotally connected to the linkage assembly, and wherein the at least one connecting portion is located between the first and second fixed portions as viewed in a direction parallel to a rotational center axis of a front sprocket of the bicycle in a state in which the first and second fixed portions are fixed to the bicycle frame.

13. The bicycle front derailleur according to claim 12, wherein the first and second fixed portions define first and second fastener axes, respectively, and a pivot axis defined by the at least one connecting portion is non-parallel to either of the first and second fastener axes.

14. The bicycle front derailleur according to claim 1, further comprising an adjusting structure configured to adjust a position of the mounting bracket relative to the bicycle frame in a direction of a fastener axis defined by the at least one fixed portion.

15. The bicycle front derailleur according to claim 14, wherein the adjusting structure includes at least one spacer selectively located between the at least one fixed portion and the bicycle frame.

16. A bicycle front derailleur comprising:
a mounting bracket configured to mount the bicycle front derailleur to a bicycle frame, wherein the mounting bracket includes:
at least one connecting portion pivotally connected to the linkage assembly; a first fixed portion through which a first fastener passes, wherein the first fixed portion defines a first fastener axis, which is non-parallel to a rotational center axis of a bicycle front sprocket in a state in which the mounting bracket is mounted to the bicycle frame; and
a second fixed portion through which a second fastener passes, wherein the second fixed portion defines a second fastener axis, which is non-parallel to the rotational center axis in the state in which the mounting bracket is mounted to the bicycle frame, and wherein the at least one connecting portion is located between the first and second fixed portions as viewed in a direction parallel to the rotational center axis.

17. The bicycle front derailleur according to claim 16, wherein the first fastener axis extends along a direction perpendicular to the rotational center axis.

18. The bicycle front derailleur according to claim 17, wherein the second fastener axis extends along the direction perpendicular to the rotational center axis.

19. The bicycle front derailleur according to claim 16, wherein the mounting bracket further comprises a main body and the first fixed portion includes a flange.

20. The bicycle front derailleur according to claim 19, wherein the front derailleur includes a chain guide, and wherein the flange protrudes from the main body away from the chain guide.

21. The bicycle front derailleur according to claim 20, wherein the flange is configured to be located closer to the bicycle frame than the chain guide in the state in which the mounting bracket is fixed to the bicycle frame.

22. The bicycle front derailleur according to claim 21, wherein the flange is a first flange, and the second fixed portion includes a second flange.

23. The bicycle front derailleur according to claim 22, wherein the second flange protrudes in a forward direction from the main body.

24. The bicycle front derailleur according to claim 16, wherein the first fastener axis and the second fastener axis are on opposite sides of a pivot joint between a first tubular part and a second tubular part of the bicycle frame in the state in which the mounting bracket is fixed to the bicycle frame.

25. The bicycle front derailleur according to claim 16, further comprising an adjusting structure configured to adjust a position of the mounting bracket relative to the bicycle frame in a direction of a fastener axis defined by one or both of the first and second fixed portions.

26. The bicycle front derailleur according to claim 25, wherein the adjusting structure includes at least one spacer selectively located between the bicycle frame and at least one of the first fixed portion and the second fixed portion.

27. A bicycle front derailleur comprising:
a chain guide including a first guide plate, second guide plate, a first bridge portion connecting the first and second guide plates at a first location and a second bridge portion connecting the first and second guide plates at a second location that is different from the first location, the first bridge portion being positioned in a first plane, the second bridge portion being positioned in a second plane;
a linkage assembly; and
a mounting bracket configured to mount the chain guide to a pivot joint of a bicycle frame such that the chain guide is movable with respect to the mounting bracket, wherein the mounting bracket includes at least one fixed portion defining a fastener axis that intersects with the first plane and the second plane, wherein the at least one fixed portion is configured to be fixed to the pivot joint, and wherein the pivot joint differs from a bottom bracket hanger of the bicycle frame.

28. The bicycle front derailleur according to claim 27, further comprising a cable attachment portion, wherein the first bridge portion is closer to the cable attachment portion than the second bridge portion, and the at least one fixed portion and the second bridge portion are located on the same side of the first plane.

29. The bicycle front derailleur according to claim 28, wherein the at least one fixed portion is positioned between the first plane and the second plane.

* * * * *